Figure 1:
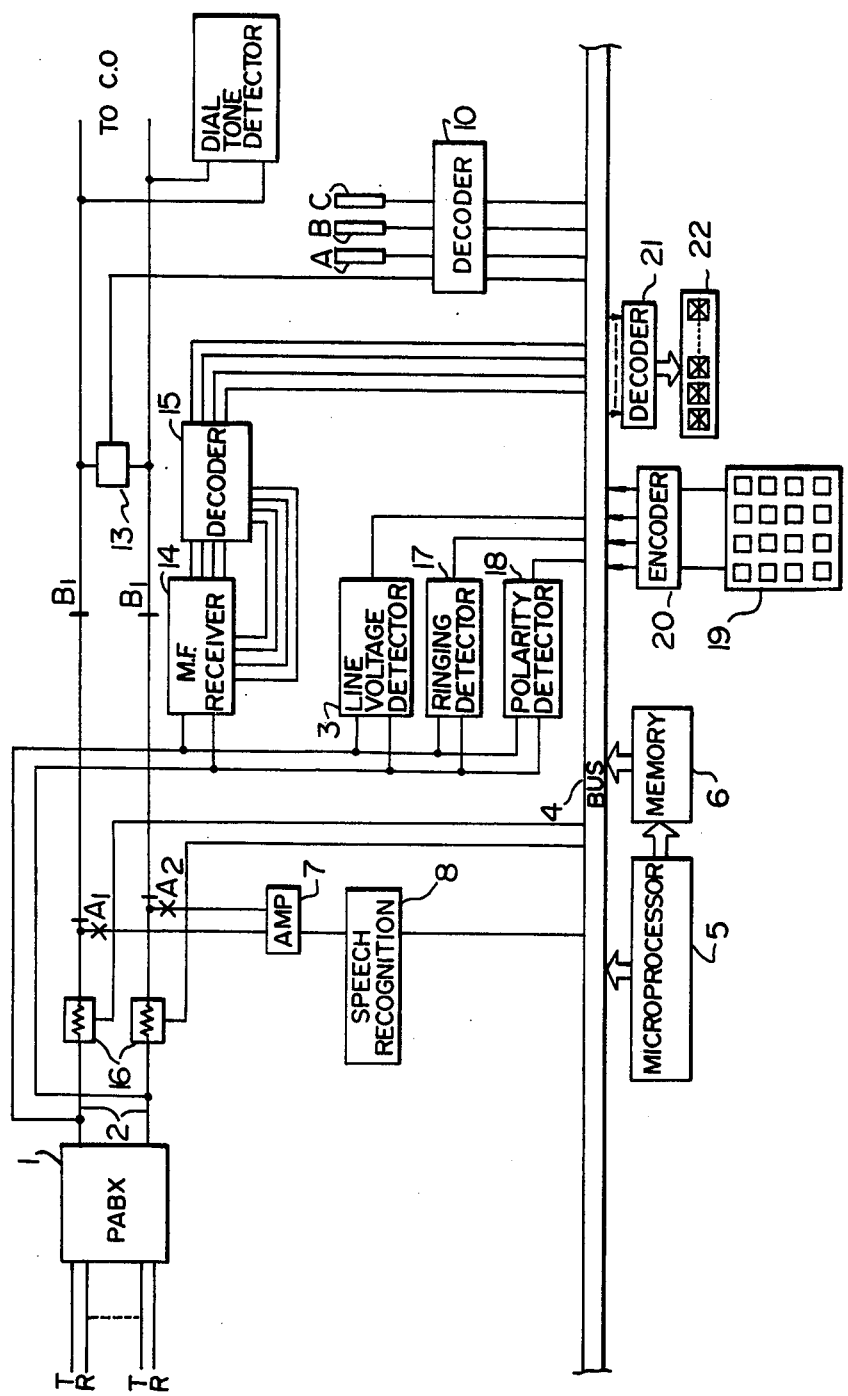

United States Patent [19]

Matthews

[11] Patent Number: 4,481,384
[45] Date of Patent: Nov. 6, 1984

[54] VOICE RECOGNIZING TELEPHONE CALL DENIAL SYSTEM

[75] Inventor: Terrence H. Matthews, Kanata, Canada

[73] Assignee: Mitel Corporation, Kanata, Canada

[21] Appl. No.: 285,654

[22] Filed: Jul. 21, 1981

[30] Foreign Application Priority Data

Apr. 16, 1981 [CA] Canada .................................. 375725

[51] Int. Cl.³ ............................................. H04M 1/66
[52] U.S. Cl. .............................. 179/18 DA; 179/18 B
[58] Field of Search ............ 179/18 DA, 18 D, 18 B, 179/18 BE, 18 FH; 381/42

[56] References Cited

U.S. PATENT DOCUMENTS

| | | | |
|---|---|---|---|
| 3,525,817 | 8/1970 | Richards | 179/18 D |
| 3,742,143 | 6/1973 | Awipi | 179/1 SA |
| 3,867,582 | 2/1975 | Weed et al. | 179/18 BE |
| 3,928,724 | 12/1975 | Byram et al. | 179/1 SD |
| 4,234,764 | 11/1980 | Beebe | 179/90 D |
| 4,283,601 | 8/1981 | Nakajima et al. | 179/1 SD |
| 4,336,422 | 6/1982 | Mellon | 179/18 DA |
| 4,346,264 | 8/1982 | Sharvit | 179/18 DA |
| 4,355,208 | 10/1982 | Cribb et al. | 179/18 DA |

FOREIGN PATENT DOCUMENTS 105486  8/1980  Japan .................................. 179/1 SD Primary Examiner—Thomas W. Brown
Attorney, Agent, or Firm—Alan H. Levine

[57] ABSTRACT

A call denial apparatus for denying a subscriber's access to a trunk. A voice recognizer is connected to the trunk, and receives a password spoken by the subscriber. The apparatus then receives digits dialed by the subscriber over the subscriber's line and carried by the trunk, matching them with one or a series of digits stored in a memory. In the event the password or subscriber's voice matches a predetermined password or voice, the digits which are dialed are passed over the trunk. However in the event that the password or voice does not match the predetermined password or voice, and in the event a predetermined one or group of digits are dialed which match a prohibited digit or group of digits stored in the memory, the trunk is split, and the subscriber is restricted from further access to the trunk. Thus only predetermined subscribers have full access to the trunk, and other subscribers have access only for limited services, or for no services. The voice recognition design allows different subscribers to have different classes of service, and for the first time does not tie trunk restriction to a subscriber's line, but to an actual subscriber.

16 Claims, 5 Drawing Figures

VOICE RECOGNIZING TELEPHONE CALL DENIAL SYSTEM

This invention relates to call restriction apparatus for telephone systems, and particularly to such apparatus which can be used in conjunction with a trunk, but is personal to the subscriber, and not to his telephone set.

It is often desirable to restrict certain personel from making unauthorized toll calls, or from gaining access to certain trunk-interfaced facilities. Yet at the same time it is desirable to give these and other subscribers access to trunks leading to a central office for local calls. Toll or other trunk restriction apparatus has previously determined whether a call should be restricted or not based on the detection of particular digits dialed at certain telephone sets, or upon recognition of predetermined numbers or specific digits dialed, to terminate further processing of the call. However this apparatus could not distinguish whether the subscriber is or is not authorized to make the call. An unauthorized subscriber could gain access to subscriber's sets to which trunk access is given.

In U.S. Pat. No. 4,000,380 issued Dec. 28, 1976, invented by J. M. Jackson, an apparatus is described which utilizes a circuit interconnected with the internal circuitry of each telephone set which is to be restricted. The apparatus counts the number of digits and upon counting a predetermined number of digits (which is evidence of a toll or outgoing call), prevents the transmission of additional digits. Since each restricted telephone set must be modified, extraordinary care must be taken before station sets are interchanged between employees, and special record keeping is required to keep track of the station sets. Both standard and non-standard telephone sets must also be manufactured and stocked. This system also does not distinguish between destinations of calls allowed or restricted from a particular telephone set, or which subscriber is using the telephone set, since only the number of digits are counted. Clearly this system introduces substantially increased costs and has minimal flexibility.

Another call denial circuit is described in U.S. Pat. No. 3,996,425, issued Dec. 7, 1976, to A. E. Low and M. J. Sturtevant. This system is used in association with a PABX and utilizes a common check circuit and a plurality of digit registers which are individually associated with particular lines to record calling data. The invention is directed to means for providing a multifrequency facility to circuitry which could previously detect rotary dialled digits. However a circuit must still be used associated with each line connected to the PABX. Further the system must be interconnected with a particular type of PABX, since it interacts with the PABX common control. Intimate knowledge of the PABX circuitry must therefore be available in order to implement that system. The system also allows unauthorized persons to gain access to trunks from which they are restricted, since it cannot distinguish between authorized and unauthorized persons.

Canadian patent application No. 359,108, filed Aug. 27, 1980, issued as Pat. No. 1,155,207, and corresponding U.S. Pat. No. 4,355,208, assigned to Mitel Corporation, describe a denial circuit which can be used with a PABX of unknown design, or with any switching network in which a plurality of lines have access to a plurality of trunks. That circuit is connected only to the trunks and to the lines, and not to the telephone sets. The number of circuits required are related to the number of trunks, rather than the number of lines, which substantially decreases the amount and complexity of the equipment, since the number of trunks provided is smaller than the number of lines. However, this circuit still restricts the use of trunks switched to or from particular telephone sets, and does not restrict individual subscribers.

There are three problems of interest associated with call restriction: (a) determination of which subscriber is making the call, (b) determination of what trunk is utilized, and (c) determination of the destination of the call, as by the dialled digits, whereby restriction can be effected. Preferably a class of restriction service should be related to the subscriber, himself, and not to the telephone set or line which he uses.

In U.S. Pat. No. 4,000,380, the problems of identifying the station set and the outgoing trunk are solved by associating the restriction apparatus with each telephone set. A rudimentary identification of a restricted number is made by counting the number of digits dialled.

In U.S. Pat. No. 3,996,425, the identity of the restricted telephone set and outgoing trunk are established by the PABX itself. A special memory associated with the PABX identifies restricted numbers.

In Canadian patent application Ser. No. 359,108, the trunk or destination path, and the station set having access thereto is identified using a tracer signal. Identity of the restricted number can then be performed by known methods such as by storing a restricted digit or series of digits in a microprocessor memory, comparing a dialled digit or digits with the restricted number, and if a match is found, dropping the trunk in the event than an acceptable station set has not been identified.

According to the present invention, once the subscriber gains access to the central office trunk, as by dialing "9" in a PABX, the central office portion of the trunk is terminated in the present circuit and the PABX portion is temporarily split and connected to a speech recognition circuit. The subscriber then speaks into his telephone handset, giving a password, his name, or another predetermined word. The speech recognition circuit translates the enunciated word into data bits which are applied to a data bus, to which a control microprocessor is connected.

The speech recognition circuit indeed can be arranged in one of a number of ways, depending on the desire of the designer. In one arrangement, a predetermined data word is applied to the bus only if the speech recognition circuit recognizes the word which is received. In another arrangement the speech recognition circuit outputs a predetermined data word which corresponds to recognition both of the voice of the subscriber and to the spoken word, or, alternatively, upon the recognition only the voice of the calling subscriber. In another arrangement, the speech recognition circuit outputs a data word corresponding to whatever enunciated word it recognizes is applied to the data bus, and the recognition of a restricted or allowed subscriber is performed by the microprocessor comparing the data word with a look-up table of predetermined data words corresponding to the voice of a subscriber or a password.

If the voice or password is not recognized, or is recognized but the look-up table specifies a partly restrictive class of service, the temporary split is closed, and dial tone from the central office is returned to the calling subscriber. The subscriber dials his digits. A digit receiver translates the digits to the central microprocessor which compares the digits with a further look-up table. If a toll call, for example, has been dialed a predetermined sequence of digits is recognized, and the trunk is permanently split (until the subscriber hangs up). If desired, the PABX portion of the trunk can be connected to a warning tone trunk. If a local call is dialed, the trunk may not be split.

If the voice or password is recognized, after the calling subscriber dials his digits, the trunk is maintained continuous, and the call is put through.

As an alternative, the trunk can be split and reconnected only if the voice or password of the subscriber is recognized, then allowing all dialed digits to be passed through to the central office.

Since the calling subscriber can call on any telephone set, access or denial of the trunk is personalized to the subscriber himself. Special circuitry need not be associated with the telephone set, allowing the freedom to utilize any telephone set by any subscriber. Neither the telephone sets, nor the line terminations on the PABX need be modified, but only the much smaller numbers of trunks to be restricted which are connected to the PABX. The PABX user thus has substantially increased flexibility of use, and interchangeability of telephone sets.

The invention in general is a trunk splitting circuit for use in a call denial apparatus comprising a circuit for detecting seizure of a trunk, a speech recognizing circuit for recognizing a predetermined enunciated word signal carried by the trunk following the seizure, a circuit for detecting dialed digits carried by the trunk following the enunciated word signal, and a circuit for splitting the trunk in the event of both the detection of predetermined ones of the dialed digits and the absence of recognition of the predetermined audio signal.

The invention is also a method of denying a subscriber's line out of a group of subscribers' lines which have access to a trunk comprising the steps of detecting seizure of the trunk, applying a voice recognition circuit to the trunk upon detecting of its seizure, detecting a predetermined voice signal received from the subscriber's line, disconnecting the voice recognition circuit from the trunk upon detection of any voice signal from the subscriber's line, monitoring the trunk for the presence of destination code digits, and splitting the trunk in the event of no detection of the predetermined voice signals and of matching of the destination code digits with a predetermined one or plurality of digits, whereby further access to the trunk by the subscriber's line is inhibited.

It should be noted that while the present circuit is described in terms of a call denial system, it can also be used to facilitate access to or denial of special service circuits, using similar principles. The circuit has particular utility in unlocking toll-based service circuits. Thus, using the present circuit, every subscriber accessing a PABX, or other switching machine, or trunks can be denied long distance service unless the subscriber's voice is recognized, or can be denied being given access on the same basis to networks, conferencing circuits, etc. Since a voice recognition distinguishes between central subscribers, different classes of service can be provided to different subscribers.

Figure 2A:
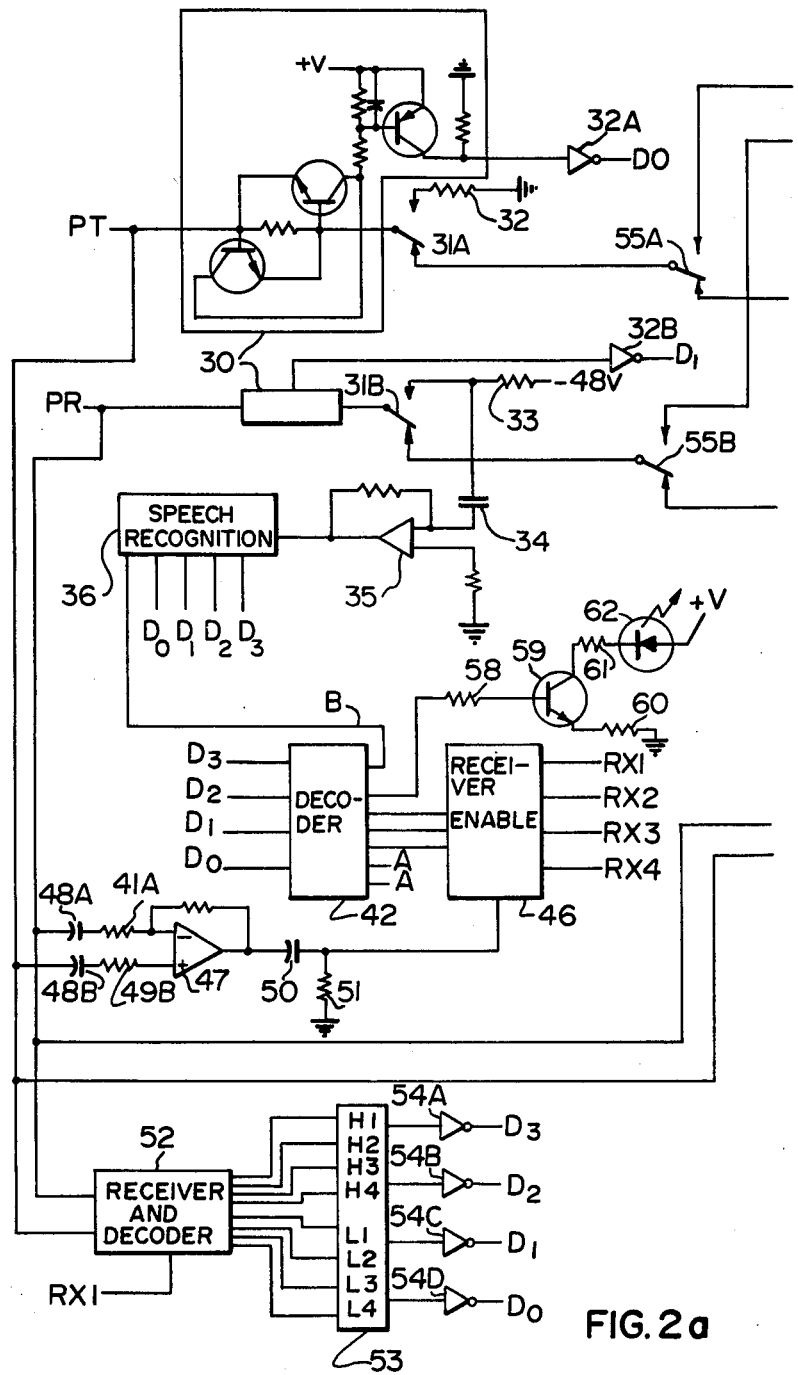
Figure 2B:
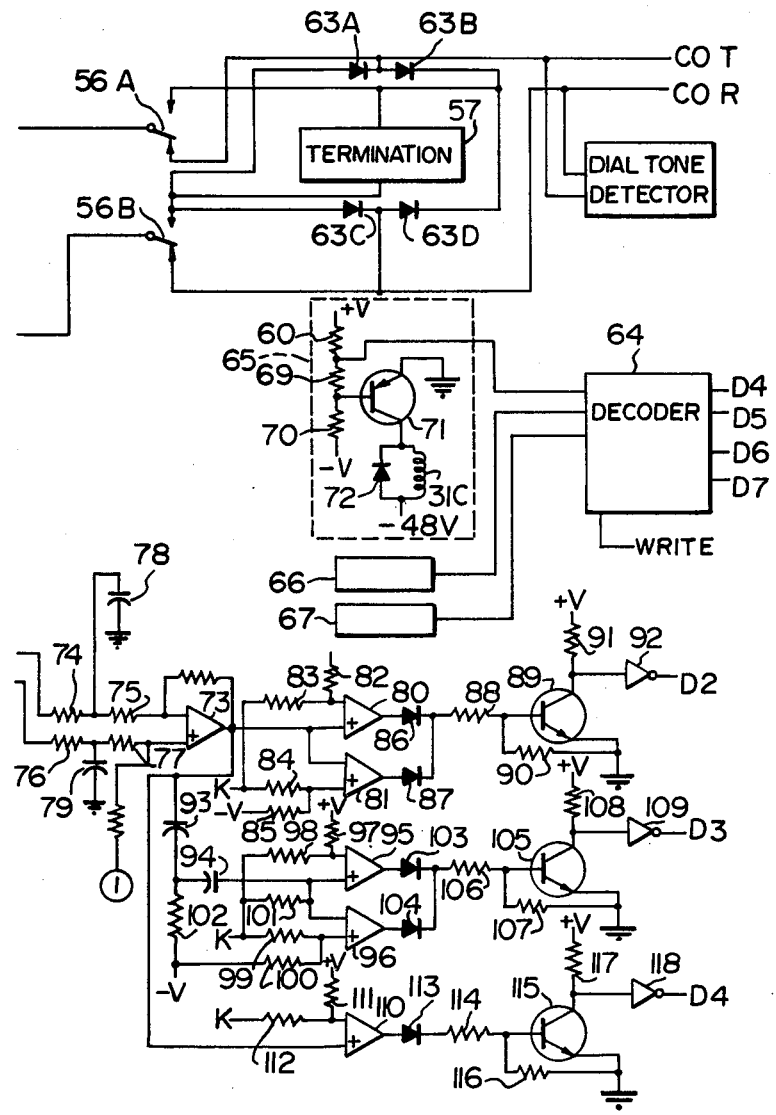
Figure 3:
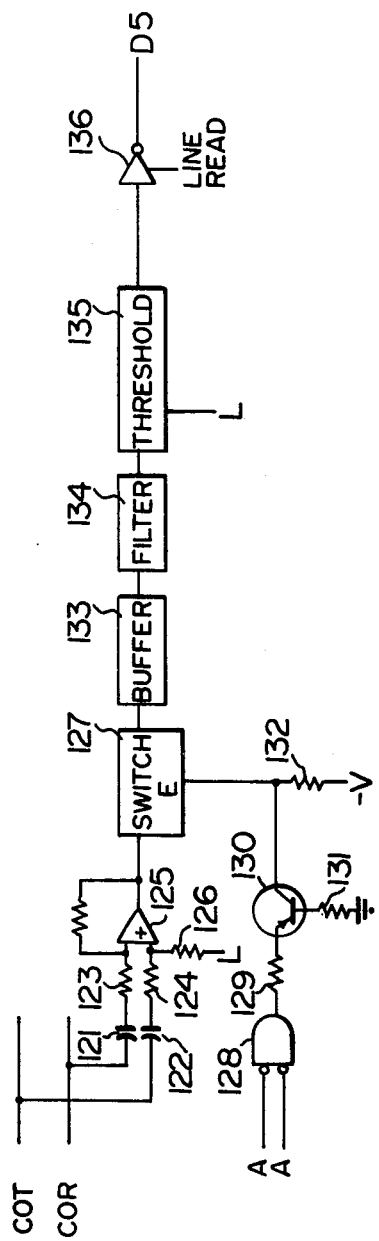

A better understanding of the invention will be obtained by reference to the detailed description below, and to the following drawings, in which:

FIG. 1 is a block schematic of the preferred embodiment of the invention,

FIGS. 2a, 2b, and 3 are schematic diagrams of the block portions of the invention shown in FIG. 1, and FIG. 2c which appears on the same page as FIG. 2b depicts how FIGS. 2a and 2b are to be placed together to form a complete schematic diagram.

The following description is of an apparatus which includes both the invention and ancilliary circuits, and utilizes a microprocessor. The function of the microprocessor and of the present invention is described in sufficient detail to allow a person skilled in the art to prepare an operation program. However as neither the microprocessor itself nor its program are the subject of this invention, and since the principles of the microprocessor and its programming are well known, a detailed description thereof is believed to be redundant to a person seeking an understanding of the present invention and will not be detailed.

Turning first to FIG. 1, which is a block schematic of the invention, the PABX 1 to which the invention is be connected which can be of standard and known construction, such as type SX-200 TM, sold by Mitel Corporation of Kanata, Canada. The PABX has at least one trunk 2, and a plurality of subscriber lines T,R connected thereto. The PABX interconnects any of the subscribers lines one to another, or to one or another of the trunks. The trunk shown connects to a central office C.O. but can alternatively be connected to a special service circuit such as a conferencing circuit, etc.

A pair of line current detectors 16 are connected to the trunk 2, and are adapted to detect seizure of the trunk. Upon detection of the seizure, they apply a binary data signal to a data bus 4. Data bus 4 is accessed by microprocessor 5 and memory 6.

Upon the microprocessor recognizing that the trunk has been seized, it applies a signal to data bus 4 which is decoded in decoder 10, and which causes the operation of relay A.

Relay A, in closing, causes operation of transfer contacts $A_1$ and $A_2$. This splits the trunk into an originating portion connected to the PABX and a central office portion which leads to the central office.

The originating portion of the trunk is connected via contacts $A_1$ and $A_2$ to the input of amplifier 7, the output of which is connected to the input of a speech recognition circuit 8. This circuit analyzes input voice signals, and in response to an algorithm contained therein, applies corresponding data signals to bus 4. The microprocessor 5 in conjunction with its memory 6, compares the data signals which are applied from speech recognition circuit 8 with previously stored data signals which correspond to predetermined subscriber's voices or words.

The data signals can be stored by dialing a predetermined secret access code, following which the subscriber enunciates the password after the access code is dialed (recognized by an m.f. receiver to be described below), the voice recognition circuit is reconnected to the trunk, and the data signals corresponding to the voice or password passed to the data bus for storage in the memory under control of the microprocessor.

Returning now to the circuit in the splitting mode, in one embodiment, if a match is made, it applies binary signals to data bus 4 to release relay A, reestablishing the connection of the trunk from the PABX to the central office. However if no match is found, the switches $A_1$ and $A_2$ remain operated, with the trunk split, thus denying the subscriber use of the trunk. A current detector 16 detects when the subscriber's line has returned to an on-hook condition, and applies signals to bus 4, thus advising the microprocessor that the split nature of the trunk can be restored to continuity.

Assuming that the voice is recognized and the trunk is cut through to the central office, dial tone is returned to the trunk, which is heard by the subscriber. The subscriber can then dial the outgoing call.

Just prior to splitting the trunk, the microprocessor also applies a data word to decoder 10 which causes operation of trunk hold circuit 13. This circuit closes a switch in series with a resistor across the central office portion of the trunk, of value about 300 ohms, to load and hold the trunk to the central office. When the A relay is released, reclosing the trunk, the hold circuit 13 is also released, unloading the trunk.

According to a second, and preferred embodiment, if voice or password recognition is made, one type of indication signal is stored in the microprocessor memory. Digits which are then dialed by the subscriber are ignored by the present circuit, allowing them all to pass to the central office. Alternatively, the present circuit can monitor the dialed digits, storing an indication signal corresponding to the voice or password, and reacting to split the trunk if the recognized voice or password indicates a particular class of service.

If the voice or password recognition is not made, the present circuit monitors subsequent dialed digits, and if predetermined ones or sequences of numbers are dialed, reacts to split the trunk as described below.

A multifrequency tone signalling receiver 14 has its inputs connected to the originating portion of the trunk. The subscriber m.f. dials in the desired destination number, which is transmitted via the trunk to the central office and is also detected in receiver 14. The outputs of receiver 14 are connected to the inputs of a decoder 15, which generates a binary signal corresponding to the keyed digits and applies it to data bus 4.

Should the subscriber's set utilize dial pulses these are detected by current detector 16 and line voltage detector 3, connected to trunk 2. The current detector 16 is comprised of low resistance (such as 39 ohms) resistors connected in series with the trunk. A transistor circuit detects voltage changes across the resistors, and generates corresponding binary signals which are applied to data bus 4. A suitable circuit for the dial pulse detector 16 is described in Canadian patent application Ser. No. 342,522 filed Dec. 21, 1979, entitled DIAL PULSE DETECTION CIRCUIT invented by Brian PASCAS and Brian VAUGHAN. Dial pulse detectors are well known, and any one which can apply suitable signals to the microprocessor can be used.

The resulting keyed or dialled digits are received by microprocessor 5, which compares the digits with a look-up table in memory 6. If the dialled digits correspond to a predetermined forbidden number or sequence stored in memory 6, microprocessor 5 applies a binary signal to data bus 4, which is decoded in decoder 10, which operates relay B. Relay B splits the trunk by opening contacts B$_1$ in series therewith, which denies further access of the subscriber to the central office portion of the trunk. At the same time the central office portion of the trunk to the central office is released.

Distinctive classes of service can thus be provided for different subscribers, since recognition of their voices allows distinguishing between each. Denial of use of the trunk thus can be considered as one of the classes of service. Other classes can be denial or provision of a conference trunk, WATS services, etc.

As a further feature, the design can have microprocessor 5 operate relay B to transfer contacts which connects the subscriber's portion of the trunk to an oscillator, and also a switch within the oscillator which causes generation of a tone frequency (diversion tone) which is heard by the subscriber and indicates to him that a forbidden sequence of numbers has been dialed, and that further processing of the call has been terminated.

Relay B, rather than operating break contact B$_1$ in series with the trunk, can instead operate a pair of transfer contacts which both breaks the trunk and transfers the originating portion to a diversion trunk, which can carry a recorded message, a tone, or the like.

It may be recognized that relays A and B both act to split the trunk, which would appear to make relay B redundant. However it is preferred that two such relays should be used since amplifier 7 and speech recognition circuit 8 can be shared by a plurality of trunks. Relay contacts similar to the A$_1$ contacts connected to other A relays are in this case connected to the input of amplifier 7. Relay A therefore should preferably remain operated only during the voice detection period, and it is preferred that an additional B relay which can remain operated for relatively long periods of time should be used for the actual denial trunk split function.

Since no modification to the station set or to the subscriber line inputs to the PABX need be made, great flexibility and ease of interchangeability of the denial feature between station sets are thus afforded.

The output of the speech recognition circuit thus effectively becomes a class of service indicator. Since the look-up table in memory 6 can store as many digits as desired, the circuit can provide a denial on either one or a sequence of predetermined dialled digits, which can be easily changed and made individual to each subscriber personally.

During normal operation of the trunk, ringing current can of course appear on the trunk from the central office which is directed to the PABX. A ringing current or voltage detector 17 is also connected across the trunk, and provides a binary signal to data bus 4 for reception by microprocessor 5 upon detection of ringing. Upon detection of ringing, and seizure of the trunk, the microprocessor is inhibited upon receipt of the noted binary signal from causing operation of relays A or B which would otherwise split the trunk for this incoming type of call.

As an additional feature a polarity detector 18 can be connected across the trunk, which detects seizure by polarity reversal. When the trunk has first been split by relay A, it is held seized to the central office by operation of hold circuit 13. At the same time the microprocessor causes operation of relay C by applying a word to data bus 4 which is decoded in decoder 10. The contacts of relay C are located in the trunk hold circuit 13, and provide a battery polarity reversal in a well known manner.

The look-up table in memory 6 can be established by the use of a key pad 19, interfacing with binary encoder 20 which has its output connected to data bus 4. A binary decoder 21 has its inputs connected to data bus 4, and its outputs to a digital display 22. Programming of the microprocessor utilizing a key pad and encoder, and displaying the data words applied thereto using a decoder and display are well known, and further explanation would be redundant to a person skilled in the art.

Turning now to FIGS. 2, 3 and 4, the invention is shown in more detail. FIG. 2 shows how FIGS. 2a and 2b are to be joined to make a single schematic. It is assumed that a person skilled in the art has sufficient knowledge of microprocessor circuitry techniques and programming sufficient to be able to drive the circuit described below. It is preferred that the microprocessor should be type 6802, available from MOTOROLA, INC. of the United States, and memory 6 should be appropriate interfacing ROMs and RAMs. A full description of the operation of such circuitry is available from Motorola Inc., and also may be found in the publication MICROCOMPUTER PRIMER by M. Waite and M. Pardee, published by Howard M. Sams & Co., Inc. of Indianapolis, Ind., U.S.A.

In the figures described below, it is assumed that the system utilizes an eight parallel bit data bus, labelled D0-D7. While the data bus leads are shown, the address bus, clock source, power supply, enable leads, etc., are not shown, since their structure are believed to be within the normal skill of the microprocessor designer.

The trunk leads 2 connected to PABX 1 (FIG. 1) labelled PT and PR are connected through a dial pulse detection circuit 30 to trunk splitting transfer contacts 31A and 31B. These contacts are part of a relay which also includes relay coil 31C (see block 65). The output of the dial pulse detection circuit is connected via buffers 32A and 32B to data bus leads D0 and D1 respectively.

The dial pulse detection circuit 30 can be any well known circuit, or the one which is described in the aforenoted patent application describing the invention DIAL PULSE DETECTION CIRCUIT, invented by Brian PASCAS and Brian VAUGHAN.

The break contacts of the relay contacts 31A and 31B are normally closed, connecting the PABX portion through to the central office portion of the trunk. The make contact portions are connected on the tip side of the trunk via resistor 32 to ground, and on the ring side via resistor 33 to a source of potential −48 V. Accordingly when relay 31 operates, −48 V and ground are extended through the tip and ring leads respectively to the PABX, in place of the same potential applied at the central office once the trunk has been seized.

The make contacts of contact 31B are also connected through isolation capacitor 34 to the input of a buffer amplifier circuit 35, the output of which is connected to the input of speech recognition circuit 36. The output of speech recognition circuit 36 is connected to data bus leads $D_0$-$D_3$.

Data bus leads $D_0$-$D_3$ are connected to the input of binary decoder 42. Other outputs of decoder 42 are connected to a receiver enable driver 46, the outputs of which are connected to the enable inputs of a plurality of multifrequency tone receivers (not shown) on leads RX1, RX2, RX3, RX4 etc. Driver 46 is adapted to select on idle receiver. Multifrequency dialed digit tones are received from the PABX portion of the trunk via operational amplifier 47 which has its inputs connected via capacitors 48A and 48B respectively in series with resistors 49A and 49B to the PT and PR leads. The output of operational amplifier 47 is connected through capacitor 50 bypassed by resistor 51 to ground, to the tone input of driver 46.

One of the selected (or a dedicated) receiver-decoders 52 is connected as shown to the trunk leads PT and PR. The outputs of receiver and decoder 52, which are four leads carrying well known and standard dialing M.F. high tone frequencies, H1, H2, H3 and H4, and four leads carrying the corresponding well known and standard low tone frequencies, L1, L2, L3 and L4 are connected to encoder 53. The outputs of encoder 53 are connected via buffer amplifiers 54A, 54B, 54C and 54D respectively to data bus leads D0-D3. A circuit which provides these functions is as described in Canadian patent application entitled Tone Decoder, invented by Patrick R. BEIRNE and Michael C. J. COWPLAND, Serial No. 312,903, filed Oct. 6, 1978. However other receivers and decoders can be used.

The break contacts of contacts 31A and 31B are connected to the transfer contacts of relay contacts 55A and 55B. The latter contacts provide the main trunk splitting function. Their make contacts can be connected to a diversion trunk (labelled DIVT and DIVR) if desired, for application of a diversion tone, a recorded announcement, etc.

The break contacts of contacts 55A and 55B are connected to the transfer contacts of a further set of contacts 56A and 56B. The latter break contacts are connected to the portion of the trunk leading to the central office, labelled as leads COT and COR. The make contacts are connected to a termination impedance 57, which is preferably optocoupler controlled as will be described below (but which can be reed relay or otherwise controlled), and contains the sensing phototransistor or photodiode (not shown) of the optocoupler.

An additional output of decoder 42 is connected via resistor 58 to the base of the optocoupler driver transistor 59. The emitter of this transistor is connected through bias resistor 60 to ground, and the collector is connected through resistor 61 to one terminal of light emitting diode 62 of the optocoupler, the other terminal of which is connected to a source of potential +V. Light emitting diode 62 is coupled to the phototransistor or photodiode referred to above used in terminating impedance 57 to form the optocoupler.

A bridge rectifier comprising diodes 63A, 63B, 63C and 63D is connected across the central office portion of the trunk, leads COT and COR. The termination impedance is connected across the bridge rectifier, deriving power therefrom; it is preferred that the terminating impedance should be active. The terminating impedance is enabled by means of the aforenoted optocoupler.

The make contacts of contacts 56A and 56B are connected across impedance 57.

A decoder 64 has its inputs connected to bus leads D4, D5, D6 and D7, and to the write enable lead of the microprocessor. Its outputs are connected respectively to relay driver circuits 65, 66 and 67. As an example of the relay driver circuit, driver 65 is shown in detail.

An output of decoder 64 is connected to the junction of two of the three series connected resistors 68, 69 and 70 connected between sources of potential +V and −V. The junction between resistors 69 and 70 are connected to the base of transistor 71, which has its emitter connected to ground. The collector of transistor 71 is connected through relay coil 31C to source of potential −48 V. A protective diode 72 is connected across relay coil 31C. As was noted earlier, relay coil 31C operates contacts 31A and 31B.

A similar relay coil in relay driver 66 operates contacts 55A and 55B, and a similar relay coil in driver 67 operates contacts 56A and 56B.

Also connected to the trunk tip and ring leads PT and PR are a line voltage detector and a ringing voltage detector, and, if desired, a line voltage polarity detector. These detectors are connected to the tip and ring leads PT and PR through a buffer amplifier circuit 73 which has its inputs respectively D.C. coupled to these tip and ring leads through resistors 74 and 75 in series, and 76 and 77 in series. The junction between resistors 74 and 75 is bypassed to ground by capacitor 78, and the junction between resistors 76 and 77 is bypassed to ground by capacitor 79.

The output of operational amplifier 73 is connected to the line voltage detector, in particular to the non-inverting input of operational amplifier 80 and the inverting input of operational amplifier 81. The inverting input of operational amplifier 80 is connected to the junction of a pair of series connected resistors 82 and 83 which are connected between a source of potential +V and a source of reference potential K. The inverting input of operational amplifier 81 is connected to the junction of a pair of series connected resistors 84 and 85 which are connected between a source of potential −V and reference potential K.

The outputs of operational amplifiers 80 and 81 are connected together through buffer diodes 86 and 87. Their junction is connected through resistor 88 to the base of transistor 89 which has its emitter connected to ground (its emitter-base junction bypassed by biasing resistor 90) and which has its collector connected to a source of potential +V through resistor 91. Its collector is connected through buffer 92 to data bus lead D2.

The output of operational amplifier 73 is also connected to a ringing voltage detector through coupling capacitor 93. This capacitor is connected through a further coupling capacitor 94 to the non-inverting input of operational amplifier 95 and to the inverting input of operational amplifier 96. The inverting input of operational amplifier 95 is connected to the junction of a pair of series connected resistors 97 and 98 which is connected between a source of potential +V and a reference potential K. Similarly the non-inverting input of operational amplifier 96 is connected to the junction of series connected resistors 99 and 100, which circuit is connected between the source of potential −V and reference potential K. The non-inverting input of operational amplifier 95 and the inverting input of operational amplifier 96 are connected to the reference potential K via resistor 101. The junction between capacitors 93 and 94 is connected to source of potential −V through resistor 102.

The output of operational amplifiers 95 and 96 are connected together through buffer diodes 103 and 104, and their junction is connected to the base of transistor 105 through resistor 106. The emitter of transistor 105 is connected to ground, and the base is connected to the emitter through biasing resistor 107. Its collector is connected to source of potential +V through resistor 108, and to data bus lead D3 through buffer 109.

The polarity detector is also connected to the output of operational amplifier 73, via a direct connection to the non-inverting input of operational amplifier 110. Its inverting input is connected to the junction of a pair of series connected resistors 111 and 112 which are connected between a source of potential +V and reference potential point K. The output of operational amplifier 110 is connected through diode 113 in series with resistor 114 to the base of transistor 115. The emitter of transistor 115 is connected to ground, and its base is connected to its emitter through resistor 116. Its collector is connected to source of potential +V through resistor 117 and to data bus D4 through buffer 118.

To obtain an indication that the central office has in fact responded to the seizure of the trunk from the PABX, a dial tone detector, for detecting dial tone extended back to the PBX from the central office, is also connected to the central office portion of the trunk, and is shown in FIG. 3. If required, a loop to ground start interface circuit should be used, as described in Canadian patent application Serial No. 324,426 filed Mar. 29, 1978, entitled LOOP TO GROUND START CIRCUIT, invented by Brian PASCAS, or some other known loop to ground interface circuit.

The central office portion of the trunk, leads COT and COR are connected via isolation capacitors 121 and 122 respectively in series with resistors 123 and 124 to the inputs of operational amplifier 125. The inverting input is connected via resistor 126 to a source of balancing potential L. The output of operational amplifier 125 is connected to the input of a CMOS switch 127.

A pair of outputs A—A of decoder 42 (FIG. 2) is connected to corresponding inputs of inverting AND gate 128. The output of AND gate 128 is connected through resistor 129 to the emitter of transistor 130, the base of which is connected through resistor 131 to ground. The collector of transistor 130 is connected to the enable input of CMOS switch 127, and through resistor 132 to source of potential −V.

The output of switch 127 is connected through a buffer 133 to the input of a dial tone bandpass filter 134. The output of filter 134 is connected through a threshold detector 135 in series with a buffer 136 to data bus lead D5. Buffer 133, filter 134, and threshold detector 136 are all of conventional construction; a reference potential L for establishing the threshold level is connected to threshold detector 135.

Operation of the circuit will now be described. Reference is made to FIGS. 2a, 2b and 3 together. The microprocessor and memory referred to is that described earlier with reference to FIG. 1.

When a subscriber goes off-hook, and accesses a trunk to the central office, the trunk is seized in the normal manner. Line current appears from the central office on the PT and PR leads, which is detected in the D.C. line current detectors 30. High level signals are placed on the data bus leads D0 and D1 via inverters 32A and 32B. These signals are received by the microprocessor, generating an interrupt.

The microprocessor in response applies a signal to data bus leads D0–D3, which is decoded in decoder 42, addressed to transistor 59. As a result the LED 62 operates in the optocoupler connected in impedance 57. The impedance provides a shunt across the COT and COR leads, maintaining the central office portion of the trunk seized from the point of view of the central office.

The microprocessor also applies a signal to data bus leads D4–D7 which is addressed to operate relay coil 31C. The signal is decoded in decoder 64, and a resulting low level voltage is applied to the junction between resistor 68 and 69 when a write signal from the microprocessor appears on the write lead of decoder 64. As a result, transistor 71 conducts, operating relay coil 31C. Contacts 31A and 31B operate, maintaining −48 volts and ground on the PR and PT leads (which was previously extended from the central office upon seizure of the trunk), and also connecting buffer amplifier 35 and speech recognition circuit 36 to the PR lead.

The microprocessor next applies a signal to data bus leads D0–D3 addressed to speech recognition circuit 36. Decoder 42 decodes the signal, applies it to the speech recognition circuit via lead B whereby it is enabled. The subscriber, having dialed an outside trunk and hearing a "click" designating that the trunk has been seized and split, now enunciates a predetermined word. The specific word which is chosen is alternative. The word can be the calling party's name, or a common word or words such as "line", "line please", a number, or the like. The resulting audio signal as passed down the PR lead, through capacitor 34, buffer amplifier 35, into speech recognition circuit 36. The speech recognition circuit can be the type which either identifies or analyzes the speech patterns of the calling party, and provides an output signal on data bus leads D0–D3 which either designates "caller identified", or is a plurality of bits which correspond to, or are unique to the calling party and the password.

The speech recognition circuit can be any of a number which are current commercially available, such as the Heuristics model 7000, or other models performing similar functions, such as model S-100, S-2000, etc., systems such as those described in U.S. Pat. Nos. 4,227,177 issued Oct. 7, 1980 to DIALOG SYSTEMS INC., 4,227,176 issued Oct. 7, 1980 to DIALOG SYSTEMS INC., and 4,227,046 issued to HITACHI LTD, to Vet 1 or Vet 2 terminal from Scott Instruments Corp., etc.

It should be noted that the system is not restricted to recognition and determination of the voice of a particular person, but may be set up to recognize the enunciation of the words themselves, only certain of the subscribers thus having the "password" to obtain the class of service for outgoing calls. However, where the speech recognition circuit is programmed to recognize individual callers voices, separate classes of service can be allocated to each subscriber. The recognition of one of a plurality of predetermined subscriber's voices, as opposed to recognition of individual words, is the preferred embodiment, whereby at least one class of service can be given to all of the subscriber's whose voices are recognized.

With the recognition of a password or a voice enunciating a predetermined word a "recognition" data signal is applied by speech recognition circuit 36 to data bus leads D0–D3. This signal is received by the microprocessor via the data bus.

It should also be noted that the speech recognition circuit of this invention can be utilized as a speech decoder, whereby encoded data signals corresponding to whatever speech signals have been received are applied to data bus leads D0–D3. In this case, the matching data signal pattern is stored in the memory associated with the microprocessor, and the microprocessor compares the signals received from the speech recognition circuit with the matching signal pattern in the equivalent of a look-up table in the associated memory. The speech recognition circuit and the associated memory look-up table are programmed in a manner understood by persons skilled in the art who are familiar with the aforenoted speech recognition circuits.

After a predetermined timed period or after determining that a word has been spoken the microprocessor then shuts off the speech recognition circuit 36 by applying a signal to data bus leads D0–D3, which signal is decoded by decoder 42, and removes the enable signal from speech recognition circuit 36 lead B. It also addresses transistor 71, causing release of relay 31C, reconnecting the break contacts 31A and 31B. The trunk conduction path thus becomes continuous again from leads PT and PR to leads COT and COR. Impedance 57 is also made high, controlled by a signal addressed from the microprocessor to transistor 59. Dial tone from the Central Office now reaches the subscriber. The subscriber then dials in digits either by keying multifrequency tones or by generating dial pulses. If the voice or password has been recognized, these dialed digits are ignored by the circuit, and the call proceeds as a normal outgoing call.

If the voice or words are not recognized, however, the dialed digits are monitored by the circuit. When dial pulses are received, the detectors 30 functioning as dial pulse detection circuitry in conjunction with a line voltage detector detects the pulses and applies them as signals to the D0, D1 and D2 data bus leads for reception by the microprocessor.

The line voltage detector is comprised of differential amplifier 73, and a threshold circuit comprising differential amplifiers 80 and 81. The voltage threshold for line voltage detection is established by the voltage K, which can be set at a reliable indication level, depending on the line. Where the voltage $-V$ is $-12$ volts, and $+V$ is $+5$ volts, the voltage at K can be chosen intermediate between the two voltages for reliable indication of an off-hook condition.

The output signals of operational amplifiers 80 and 81 are passed through isolation diodes 86 and 87 to data bus driver transistor 89, which begins conducting. This places a low level input to buffer 92, which applies a high voltage level signal to data bus lead D2.

The microprocessor, having a look-up table of forbidden numbers or sequences of numbers stored in memory associated with the password or voice recognition data signal or with a particular data signal corresponding to a voice which has been decoded compares the dialled digits therewith. It should be noted that the digits can be composed merely of the prefix "1", indicating the initiation of a long-distance call, a sequence of digits indicating a forbidden destination, a total number of digits which number indicates desired access to a forbidden destination or trunk, etc. Upon finding a match in its look-up table, the microprocessor addresses a relay which operates contacts 55A and 55B, by applying an address signal to data bus D4–D7, which is decoded in decoder 64, and as described earlier with respect to relay driver 65, causes operation of the relay in relay driver 66 circuit which operates trunk splitting contacts 55A and 55B, splitting the trunk. Impedance 57 is not now activated. If a normal local interoffice call is being made, the dialed digits merely activate the local central office, which puts through the call. The trunk is not split.

The trunk being split causes the PT and PR leads to be connected to the DIVT and DIVR diversion leads. If desired a tone source can be connected to these leads, or a prerecorded message or the like which indicates to the calling subscriber that the trunk has been split and that his call will not be put through.

Relay contacts 55A and 55B are held operated as long as the trunk remains seized. Should the trunk be released, this is detected by the line voltage detector, which changes its signal applied to the D2 data bus lead, resulting in the microprocessor causing release of the relay operating contacts 55A and 55B.

It should be noted that when the trunk is initially seized at the PABX, it is desirable to indicated to the microprocessor that the central office has in fact responded to the seizure of the trunk. While the extension of −48 volts and ground on the trunk can be used as an indicator, dial tone is a better indicator, since it signals that the central office is prepared to accept dialled digits. It is preferred that operation of contacts 31A and 31B should not occur until the dial tone from the central office has been received.

In the dial tone detector (FIG. 3) connected to the COT and COR leads in an A.C. isolated buffer amplifier 125, which applies A.C. signals received from the central office portion of the trunk circuit to the present circuit. The signals are applied through switch 127 and buffer 133 to a dial tone filter 134. Filter 134 can be a standard filter adapted to pass dial tone frequencies.

There are of course many different kinds of signals normally received on the central office portion of the trunk, including voice frequency signals (some of which may be within the frequency band of the dial tone), ringing signals, noise, etc. Therefore it is preferred (but is not essential) to switch the dial tone detector circuit on only after seizure of the PABX portion of the trunk, which establishes the time after which the dial tone signal from the central office may be present and should be detected. Once the trunk has been seized from the PABX, the microprocessor applies a signal on data bus leads D0–D3 which is decoded by decoder 42, and is applied to leads A—A. This is received in inverting AND gate 128, which applies a high level signal to the emitter of transistor 130. This causes the collector to go to high level, enabling switch 127, which preferably is a CMOS switch.

The dial tone on the trunk passes through switch 127, buffer 133, filter 134, and is applied through threshold circuit 135 to buffer 136, and thence to the data bus lead D5. Buffer (tri-state gate) 136 is enabled upon reception of a signal from the microprocessor on the LINE READ lead. Upon reception of dial tone and indication thereof to the microprocessor, the microprocessor shuts off switch 127 by the same method described above.

There are a number of additional circuits which can be associated with the above-described system. Examples of some are described below, with reference to FIGS. 2a and 2b.

The central office will apply ringing voltage to the trunk for an incoming call to the PABX; a ringing voltage detector detects the ringing voltage on the PABX portion of the trunk. Ringing voltage is applied from the PT and PR leads through operational amplifier 73, coupling capacitors 93 and 94 to operational amplifiers 95 and 96. The ringing detection threshold is established by the voltage applied to lead K which is at the junction of resistors 101 and 99. The output of operational amplifiers 95 and 96 are applied through isolation diodes 103 and 104 to the input of data bus driver transistor 105. This transistor operates similarly to transistor 89 described earlier, and, upon operating, applies a high level signal to data bus lead D3.

The microprocessor thus receives an indication that a ringing signal has been applied to the trunk. Since this only appears with an incoming call, the later detection of seizure of the trunk upon answering of the call by the PABX operator inhibits the microprocessor from causing operation of relay contacts 31A and 31B, which would otherwise split the trunk and connect the voice recognition circuit to it. Since the ringing signal precedes the seizure of the trunk, the transmission path is allowed to remain intact for the duration of the call.

It should be noted that contacts 56A and 56B are normally made such that the trunk path is through to the COT and COR leads. A diode bridge comprising diodes 63A–63B is connected across the COT and COR leads in a polarity direction such that power is provided for the optocoupler-operated termination impedance 57. This circuit preferably has a phototransistor input which drives a Darlington transistor pair output having a typically 310 ohm load. With contacts 56A and 56B in their idle position as shown, and with the impedance not activated, virtually no dialing or voice signals are diverted through the diode bridge and load.

However, upon splitting of the trunk by operation of contacts 31A and 31B after the trunk has been seized, it must be maintained seized to the central office. Accordingly as described earlier the microprocessor applies a signal addressed to light emitting diode 62, by applying a binary signal to data bus leads D0–D3, which is decoded in decoder 42. The resulting signal is appied to the base of transistor 59, which begins conducting in its emitter-collector circuit. This causes LED 62 to conduct, illuminating it and causing the coupled phototransistor in load 57 to begin conducting. The load thus becomes activated, applying the aforenoted 310 ohm resistor across the central office portion of the trunk, COT and COR. The central office thus detects only the maintenance of a load thereacross, and it maintains the trunk to the PABX.

Certain PABXs seize a trunk by signalling a polarity reversal. This is detected by sensing the D.C. voltage passed through operational amplifier 73 from the PT and PR leads, by operational amplifier 110. The resulting output signal is applied through isolation diode 113 to the base of transistor 115. As described earlier with respect to transistor 89, the input to inverting buffer 119 goes to low level, and a high level signal is applied to data bus lead D4.

Upon detection of a polarity reversal, the microprocessor applies a signal to data bus leads D4–D7 which is decoded in decoder 64, and which operates relay driver circuit 67. A relay coil within relay driver circuit 67 operates as described earlier with reference to driver circuit 65, operating relay contacts 56A and 56B. This effectively connects the PABX portion of the trunk to the diode bridge with opposite polarity, i.e., the ring lead being connected to the positive terminal of the bridge (the anodes of diodes 63A and 63C) and the tip lead to the negative terminal of the bridge. This maintains the direction of power application to the bridge, with the polarity reversal from the PABX.

If the subscribers connected to the PABX dial using multifrequency keyed signals, a circuit is provided to detect such multifrequency signals. A receiver and decoder 52 (FIG. 2) is connected across the PR and PI leads. A suitable multifrequency digit receiver and decoder chip is available from a number of Canadian and American manufacturers, although the preferred circuit is described in Canadian application Ser. No. 312,903, filed Oct. 6, 1978, entitled TONE DECODER, invented by Michael C. J. Cowpland and Patrick R. Beirne. The output of this or similar circuits is a binary signal representing the high tone frequency, which appears on leads H1–H4, and a binary signal representing low tone frequency, which appears on a plurality of leads L1–L4. These two binary signals, a pair representing a dialled digit, are applied to data encoder 53, and the resulting output is applied through buffers 54A–54D to data bus D0–D3. Where there are a plurality of receivers which are used to service a larger number of trunk splitting circuits, the microprocessor can of course keep record of which are currently busy. To allocate a particular idle receiver to receive digits from the trunk, a binary word is applied by the microprocessor to decoder 42 via data bus leads D0–D3. This signal is applied to a receiver enable circuit 46, which applies an output signal to one of the leads RX1–RX4, one for the enable input of each of, for example, four receivers.

As a variation of the above circuit, the multifrequency digit signal is applied from leads PT and PR to A.C. isolated operational amplifier 47, which applies the resulting signal through receiver enable circuit 46 to the selected receiver. In this case the receiver enable circuit switches the output of operational amplifier 47 to the selected idle receiver input which is connected to one of the leads RX1–RX4.

The above-described circuit thus obtains identification of the subscriber to which trunk restriction may be implemented, determines whether in fact a restriction is applicable, facilitates detection of a dialled destination code, and if the call should be denied, splits the trunk and restricts further access to the central office portion of the trunk by the calling subscriber. The denial or access to the trunk is thus now provided to the personal subscriber, and is not restricted to particular subscriber's sets.

A person understanding this invention may now conceive of other embodiments, improvements, etc., using the same or similar principles. All are believed to be within the sphere and scope of this invention as defined in claims appended hereto.

The embodiments of the invention in which an exclusive property or privilege is claimed are defined as follows:

1. A trunk splitting circuit comprising:
   (a) means for detecting seizure of a trunk,
   (b) means for recognizing a predetermined enunciated word audio signal carried by the trunk following detection of said seizure,
   (c) means for detecting dialed digits carried by the trunk following said enunciated word signal,
   (d) means for storing representations of one or a plurality of predetermined digits, and for comparing said predetermined digit or digits with the dialed digits, and
   (e) means for splitting said trunk in the event of both the matching of said predetermined digit or digits with said dialed digits and the recognition of audio signals other than said predetermined audio signal.

2. A trunk splitting circuit as defined in claim 1, including means for generating a data signal corresponding to the predetermined audio signal as a class of service indicator signal, means for correlating the class of service indicator data signal with said representations of predetermined digits, and for enabling the trunk splitting means in the event the class of service signal does not correlate with said representations of predetermined digits.

3. A trunk splitting circuit as defined in claim 1 or 2, in which the data signal generating means is comprised of a speech recognition circuit adapted to distinguish at least one predetermined word as said predetermined audio signal, and to generate said data signal in response to the distinguishing of said word.

4. A trunk splitting circuit as defined in claim 2, in which the data signal generating means is comprised of a speech recognition circuit adapted to distinguish at least one predetermined voice pattern as said predetermined audio signal, and to generate said data signal in response to the distinguishing of said word.

5. A trunk splitting circuit as defined in claim 2, in which the data signal generating means is comprised of a speech recognition circuit adapted to distinguish predetermined voice patterns as said predetermined audio signal, and to generate data signals in response to said voice patterns as class of service indicator data signals, and means for enabling the trunk splitting means in the event predetermined class of service indicator signals do not correlate with predetermined ones or groups of dialed digits.

6. A call denial apparatus for use in a telephone system comprising:
   (a) means for detecting seizure of a trunk,
   (b) means for splitting and terminating the trunk upon detection of the trunk seizure, into an originating portion and a central office portion, and for terminating the central office portion so as to maintain it in a seized condition,
   (c) voice recognizing means for detecting a predetermined voice pattern carried by the originating portion of the trunk when the trunk is split, and for generating a predetermined class of service data signal in response thereto,
   (d) means for reconnecting said portions of the trunk upon generation of said data signal,
   (e) a dialed digit signal detector connected to the trunk, including means for registering one or a sequence of dialed digits,
   (f) means for storing one or a sequence of representations of predetermined digits, and for comparing them with said dialed digits, and
   (g) means for splitting the central office portion from the originating portion of the trunk in the event of both generation of a class of service data signal other than said predetermined class of service data signal and matching of said dialed digits with said one or a sequence of said predetermined digits, whereby further access to the central office portion of the trunk from the originating portion is denied and whereby the trunk is maintained connected in the event of either said predetermined class of service data signal being generated or the detected digits being other than said one or predetermined sequence of digits, thus allowing said digit signals to be transmitted via the central office portion of the trunk.

7. A call denial apparatus as defined in claim 6, in which the means for detecting seizure of a trunk includes a line current detector.

8. Apparatus as defined in claim 7 further including means for detecting digits dialed from the originating portion of the trunk, means for storing a predetermined digit or series of digits, means for comparing the detected digits with said stored digit or series of digits, and means for retaining the trunk continuous in the event of both the generation of predetermined form of the first data signal and the coincidence of the dialled digits and said stored digit or series of digits, whereby further progress of the call is facilitated, and for splitting the trunk in the event of generation of other forms of the first data signal and the coincidence of the dialled digits and said stored digit or series of digits, whereby further progress of the call is denied.

9. A call denial apparatus for use in a telephone system having a plurality of subscribers' lines interconnectable with at least one trunk comprising:
   (a) means for detecting seizure of a trunk,
   (b) means for connecting a voice recognition circuit to the trunk upon detection of said seizure,
   (c) means for detecting a predetermined voice signal received from a subscriber's line which has access to the trunk,
   (d) means for storing a representation of at least one predetermined digit,
   (e) means for registering at least one digit dialed over the trunk, and for comparing it with said predetermined digit, and
   (f) means for open circuiting the trunk in the event of both the detection of voice signals other than the predetermined voice signal and the matching of said dialed digit with said predetermined digit, whereby the subscriber's line is restricted from further access to the trunk.

10. A call denial apparatus as defined in claim 9, in which the means for registering at least one digit dialed over the trunk includes a digit receiver and means for storing representations of a plurality of received digits received by said receiver, and further including means for storing representations of predetermined digits, and means for enabling the trunk open circuiting means upon one or a sequence of representations of the received digits matching one or a sequence of the representations of said predetermined digits.

11. A trunk splitting circuit comprising:
   (a) means for detecting seizure of a trunk,
   (b) means for splitting the trunk upon detection of said seizure into a subscriber portion and a central office portion,
   (c) means for connecting a voice or password recognizing circuit to the subscriber portion of the trunk upon the trunk being split,
   (d) means for detecting a predetermined password or voice received from the subscriber portion of the trunk,
   (e) means for storing a representation of at least one predetermined digit,
   (f) means for registering at least one digit dialed over the subscriber portion of the trunk, and for comparing it with said predetermined digit, and
   (g) means for maintaining the trunk split in the event of both the detection of passwords or voices other than the predetermined password or voice and the matching of said dialed digit with said predetermined digit.

12. A method of denying a subscriber's line out of a group of subscribers' lines use of a trunk comprising:
   (a) detecting seizure of the trunk,
   (b) applying a voice recognition circuit to the trunk upon detection of its seizure,
   (c) providing for detection of a predetermined voice signal that may be received from the subscriber's line,
   (d) monitoring the trunk for the presence of destination code digit signals,
   (e) comparing said destination code digit signals with one or a plurality of predetermined destination code digit signals, and
   (f) splitting the trunk in the event of the detection of voice signals other than the predetermined voice signal and correspondence of the destination code digit signals with said predetermined one or plurality of signals, whereby further access to the trunk by the subscriber's line is inhibited.

13. A method of denying a subscriber use of a communication toll facility comprising:
   (a) detecting seizure of the communication toll facility,
   (b) monitoring a transmission path associated with said signal facility with a voice recognizing circuit,
   (c) detecting a predetermined voice or spoken password carried by the transmission path,
   (d) monitoring the transmission path for the presence of destination code signals,
   (e) comparing said destination code signals with one or a plurality of predetermined destination code signals, and
   (f) disconnecting the communication toll facility from utilization by the subscriber in the event of detection of voices or spoken passwords other than the predetermined voice or spoken password and correspondence of the destination code signals with said one or a plurality of signals, or
   (g) maintaining said facility seized and utilizable by the subscriber in the event of detection of said predetermined voice or spoken password by the voice recognizing circuit and correspondence of the destination code signals with said one or a plurality of signals.

14. A method as defined in claim 13, in which the communication toll facility is a trunk which includes said transmission path.

15. A method of denying a subscriber use of a communication facility comprising:
   (a) detecting seizure of the communication facility,
   (b) monitoring a transmission path associated with said facility with a voice recognizing circuit,
   (c) detecting a predetermined voice or spoken password received from the transmission path,
   (d) monitoring the transmission path for the presence of destination code signals,
   (e) comparing said destination code signals with one or a plurality of predetermined destination code signals, and
   (f) disconnecting the communication toll facility from utilization by the subscriber in the event of detection of voices or spoken passwords other than the predetermined voice or spoken password, or
   (g) maintaining said facility seized and utilizable by the subscriber in the event of detection of said predetermined voice or spoken password by the voice recognizing circuit and correspondence of the destination code signals with said one or a plurality of signals.

16. A method as defined in claim 15 in which the communication facility is a voice or data trunk which includes said transmission path.

* * * * *

UNITED STATES PATENT OFFICE
CERTIFICATE OF CORRECTION

PATENT NO. : 4,481,384
DATED : November 6, 1984
INVENTOR(S) : Terrence H. Matthews It is certified that error appears in the above-identified patent and that said Letters Patent are hereby corrected as shown below:

Claim 15, line 13, delete "toll".

Signed and Sealed this

Twenty-first Day of May 1985

[SEAL]

Attest:

DONALD J. QUIGG

*Attesting Officer*     *Acting Commissioner of Patents and Trademarks*